(12) United States Patent
Ookubo et al.

(10) Patent No.: US 10,648,997 B2
(45) Date of Patent: May 12, 2020

(54) ROTATION RATE DETECTING APPARATUS AND ROTATION RATE DETECTING METHOD

(71) Applicant: SONY CORPORATION, Tokyo (JP)

(72) Inventors: Masashi Ookubo, Kanagawa (JP); Yoshitaka Suga, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 214 days.

(21) Appl. No.: 15/129,046

(22) PCT Filed: Feb. 20, 2015

(86) PCT No.: PCT/JP2015/054781
§ 371 (c)(1),
(2) Date: Sep. 26, 2016

(87) PCT Pub. No.: WO2015/151639
PCT Pub. Date: Oct. 8, 2015

(65) Prior Publication Data
US 2017/0115319 A1    Apr. 27, 2017

(30) Foreign Application Priority Data
Apr. 4, 2014    (JP) .................. 2014-077706

(51) Int. Cl.
*G01P 3/487* (2006.01)
*B62J 99/00* (2020.01)
*H04N 7/18* (2006.01)

(52) U.S. Cl.
CPC .............. *G01P 3/487* (2013.01); *B62J 99/00* (2013.01); *H04N 7/185* (2013.01);
(Continued)

(58) Field of Classification Search
CPC .......... G01P 3/487; H04N 7/185; B62J 99/00; B26J 2099/004; B26J 2099/002;
(Continued)

(56) References Cited

U.S. PATENT DOCUMENTS

| 4,526,036 A | 7/1985 | Morrison | |
| 5,992,553 A * | 11/1999 | Morrison | ................. B62M 6/45 180/206.2 |
| 2013/0066448 A1 * | 3/2013 | Alonso | ................... H04Q 9/00 700/91 |

FOREIGN PATENT DOCUMENTS

| JP | 2009-276282 A | 11/2009 |
| JP | 2012-106553 A | 6/2012 |
| JP | 2013-095306 A | 5/2013 |

OTHER PUBLICATIONS

Apple, iPhone 5S Specifications, May 16, 2018, First Editition, 1st vol., pp. 1-9.*

(Continued)

*Primary Examiner* — Judy Nguyen
*Assistant Examiner* — Leo T Hinze
(74) *Attorney, Agent, or Firm* — Chip Law Group

(57) ABSTRACT

A rotation rate detecting apparatus that includes a rotation rate calculating unit configured to calculate a rotation rate of a pedal in a riding apparatus having the pedal rotating by pedaling operation of a user, based on sensor information of an acceleration sensor. The rotation rate calculating unit calculates a rotation rate based on information corresponding to acceleration in a traveling direction of the riding apparatus or a roll direction with respect to the traveling direction in association with movement of the user or the riding apparatus.

18 Claims, 14 Drawing Sheets

(52) U.S. Cl.
CPC ....... *B60Y 2200/13* (2013.01); *B60Y 2400/92* (2013.01); *B62J 2099/002* (2013.01); *B62J 2099/004* (2013.01); *B62J 2099/0013* (2013.01); *B62J 2099/0026* (2013.01); *B62K 2207/00* (2013.01)

(58) Field of Classification Search
CPC ...... B26J 2099/0026; B26J 2099/0013; B60Y 2209/92; B60Y 2200/13; B26K 2207/00
See application file for complete search history.

(56) References Cited

OTHER PUBLICATIONS

Wikipedia, iPhone 5S, Jun. 24, 2018, Wikipedia, 1st Edition, 1st vol., pp. 1-14.*
"iPhone User Guide for iOS 7.1 Software," 2014, Apple, Inc., 1st, pp. 73-81, 89-91 (Year: 2014).*

\* cited by examiner

ROTATION RATE DETECTING APPARATUS AND ROTATION RATE DETECTING METHOD

CROSS REFERENCE TO RELATED APPLICATIONS

This application is a U.S. National Phase of International Patent Application No. PCT/JP2015/054781 filed on Feb. 20, 2015, which claims priority benefit of Japanese Patent Application No. JP 2014-077706 filed in the Japan Patent Office on Apr. 4, 2014. Each of the above-referenced applications is hereby incorporated herein by reference in its entirety.

TECHNICAL FIELD

The present disclosure relates to a rotation rate detecting apparatus, a rotation rate detecting method, and a program.

BACKGROUND ART

In the past, as a technology for detecting information regarding cycling of a bike, a technology of detecting a rotation rate of a pedal is known. For example, Patent Literature 1 discloses a technology in which a crank rotation sensor is attached to a chain stay of a bike, which faces a pedal, a magnet is attached to the pedal, and a magnetic field line of the magnet which revolves in accordance with rotation of the pedal is detected for each revolution of the crank. Patent Literature 1 describes that a detection value of the crank rotation sensor is transmitted to a display apparatus, or the like, using a wireless communication apparatus. Further, Patent Literature 2 discloses a technology in which a rotation rate of a pedal is detected using angular velocity detected by an angular velocity sensor attached to a bike.

CITATION LIST

Patent Literature

Patent Literature 1: JP 2013-95306A
Patent Literature 2: JP 2012-106553A

SUMMARY OF INVENTION

Technical Problem

However, the technology disclosed in the above-described Patent Literature 1 requires a relatively large number of parts, including a magnet, a magnetic sensor, a communication apparatus, or the like. Further, the technology disclosed in the above-described Patent Literature 2 uses an angular velocity sensor and requires relatively large power consumption.

Therefore, the present disclosure proposes a new and improved rotation rate detecting apparatus which can be realized with a small number of parts with saved power, a rotation rate detecting method and a program.

Solution to Problem

According to the present disclosure, there is provided a rotation rate detecting apparatus including: a rotation rate calculating unit configured to calculate a rotation rate of a pedal in a riding apparatus having the pedal rotating by pedaling operation of a user, based on sensor information of an acceleration sensor.

In addition, according to the present disclosure, there is provided a rotation rate detecting method including: a step of detecting sensor information of an acceleration sensor in association with movement of a riding apparatus having a pedal rotating by pedaling operation of a user or the user; and a step of calculating a rotation rate of the pedal based on the detected sensor information.

In addition, according to the present disclosure, there is provided a program for causing a computer to realize a function of: calculating a rotation rate of a pedal in a riding apparatus having the pedal rotating by pedaling operation of a user based on sensor information of an acceleration sensor.

Advantageous Effects of Invention

According to the present disclosure as described above, it is possible to provide a rotation rate detecting apparatus which can be realized with a small number of parts with saved power, a rotation rate detecting method and a program.

Note that the effects described above are not necessarily limited, and along with or instead of the effects, any effect that is desired to be introduced in the present specification or other effects that can be expected from the present specification may be exhibited.

DESCRIPTION OF EMBODIMENTS

Figure 1:
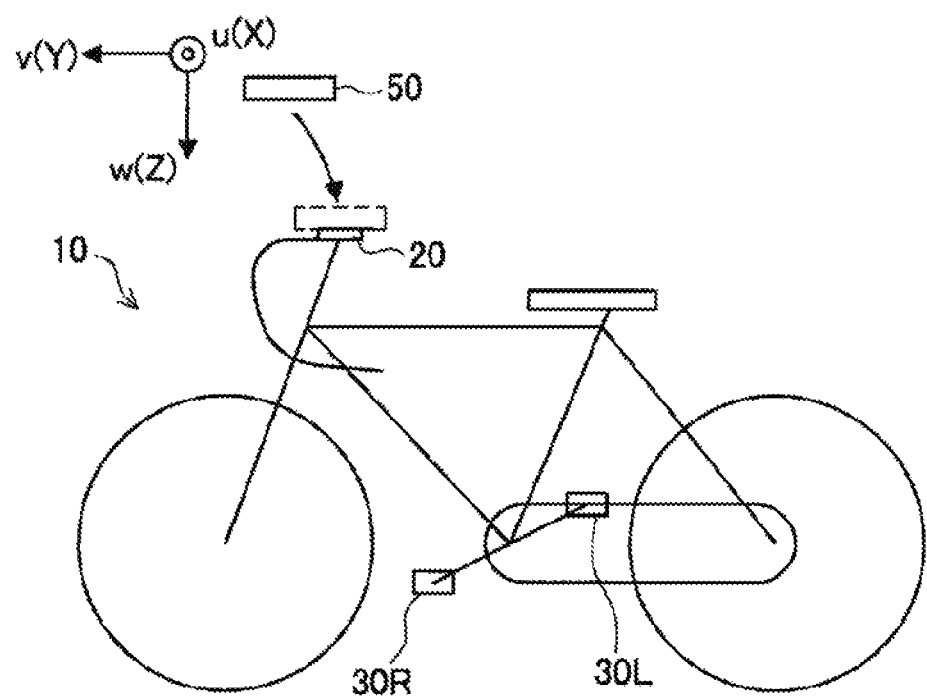
FIG. 1 is a diagram illustrating an aspect where a mobile device according to a first embodiment of the present disclosure is attached to a bike.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. First Embodiment (Mobile Device: Example Where Mobile Device is Used by being Fixed at Bike)
1.1. Configuration Example of Mobile Device
1.2. Basic Configuration Example of Rotation Rate Detecting Apparatus
1.3. Example of Rotation Rate Detecting Processing
1.3.1. Processing Example (1) Where Acceleration in Travelling Direction is Used
1.3.2. Processing Example (2) Where Output Value in Triaxial Direction is Used
2. Second Embodiment (Wearable Device: Example Where Wearable Device is Used by Being Wound Around Arm of User)
3. Third Embodiment (Example of Computer Equipment)
4. Fourth Embodiment (Example of Imaging Apparatus)
4.1. Configuration Example of Imaging Apparatus
4.2. Application Example of Imaging Apparatus
4.2.1. Application Example (1)
4.2.2. Application Example (2)
4.2.3. Application Example (3)

<1. First Embodiment>
[1.1. Configuration Example of Mobile Device]

Figure 2:
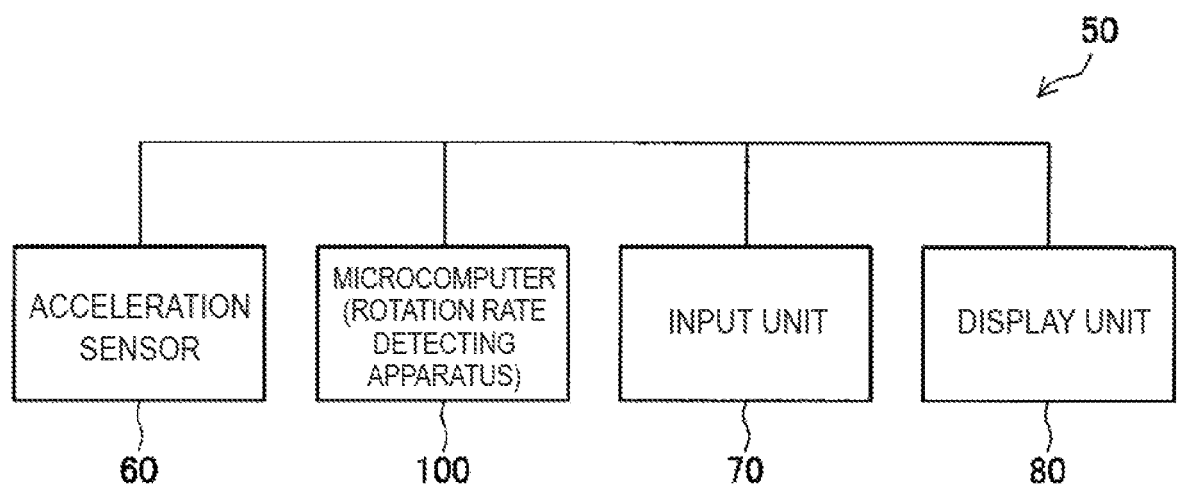
FIG. 2 is a diagram illustrating a configuration example of the mobile device according to the first embodiment.

First, a schematic configuration of a mobile device 50 including a rotation rate detecting apparatus 100 according to the first embodiment of the present disclosure will be described with reference to FIG. 1 and FIG. 2. FIG. 1 is a schematic diagram illustrating an aspect where the mobile device 50 is attached to a bike 10, and FIG. 2 is a diagram illustrating a configuration example of the mobile device 50.

The mobile device 50 is configured to be able to detect a rotation rate N (rpm) of pedals 30L, 30R of the bike 10 using acceleration detected by an acceleration sensor 60. The mobile device 50 according to the present embodiment is configured to be able to be attached to and detached from a fixing unit 20 attached to a steering wheel portion of the bike 10. The bike 10 is one example of a riding apparatus, and the riding apparatus is not limited to the bike 10. The riding apparatus may be any apparatus having at least two operation pedals operated by a user, but the mobile device 50 according to the present embodiment is used by being fixed at the riding apparatus, and is particularly suitable as an apparatus which detects a pedal rotation rate N of a riding apparatus which moves by pedaling operation of pedals.

The mobile device 50 includes an acceleration sensor 60, an input unit 70, a display unit 80 and a rotation rate detecting apparatus 100. The mobile device 50 is, for example, a smartphone, and includes the acceleration sensor 60 as a component for fulfilling inherent functions of the smartphone. That is, the mobile device 50 is not required to additionally include the acceleration sensor 60. However, the smartphone is one example of the mobile device 50, and other devices may be used as the mobile device 50.

The acceleration sensor 60 is configured as the acceleration sensor 60 which can detect acceleration (m/s$^2$) in triaxial directions (u, v, w). This acceleration sensor 60 utilizes the acceleration sensor 60 inherently provided at the mobile device 50. Here, the acceleration sensor 60 does not necessarily require to have triaxial detection axes, and may be a sensor which can detect at least acceleration Acc_Y in a travelling direction of the bike 10 or acceleration Acc_X in a roll direction with respect to the travelling direction. Because the acceleration sensor 60 consumes power of approximately several tens of μW, the acceleration sensor 60 contributes to power saving compared to an angular velocity sensor which consumes power of several mW.

Note that, in the present specification, an output value Acc_u is an output value corresponding to a u axis among the detection axes of the acceleration sensor 60. An output value Acc_v is an output value corresponding to a v axis among the detection axes of the acceleration sensor 60. An output value Acc_w is an output value corresponding to a w axis among the detection axes of the acceleration sensor 60. Further, the acceleration Acc_X is acceleration in the roll direction (X direction) with respect to the travelling direction of the bike 10 or the user (hereinafter, also referred to as "roll direction acceleration"). The acceleration Acc_Y is acceleration in the travelling direction (Y direction) of the bike 10 or the user (hereinafter, also referred to as "travelling direction acceleration"). Acceleration Acc_Z is acceleration in a vertical direction (Z direction) in a state where the bike 10 stands erect (hereinafter, also referred to as "vertical direction acceleration").

In the present embodiment, when the mobile device 50 is appropriately attached to the fixing unit 20 of the bike 10, the v axis among the detection axes of the acceleration sensor 60 is oriented in the traveling direction (Y direction) of the bike 10. Further, the u axis among the detection axes of the acceleration sensor 60 is oriented to the roll direction (X direction) with respect to the travelling direction. Still further, the w axis among the detection axes of the acceleration sensor 60 is oriented to the vertical direction (Z direction). In the present embodiment, the travelling direction acceleration Acc_Y (=Acc_v) is detected such that a forward direction in the travelling direction is detected as a positive value and a backward direction is detected as a negative value. Further, the roll direction acceleration Acc_X (=Acc_u) is detected such that a roll direction toward a left side of the forward direction in the travelling direction is detected as a positive value and a roll direction toward a right side is detected as a negative value. Still further, the vertical direction acceleration Acc_Z (=Acc_w) is detected such that a downward direction is detected as a positive value and an upward direction is detected as a negative value. However, directions of positive and negative may be set in an opposite fashion.

The input unit 70 is configured with a touch panel apparatus of the smartphone. The rotation rate detecting apparatus 100 can be activated or stopped by the user performing input operation of the touch panel apparatus. However, the touch panel apparatus is one example of the input unit 70, and an operation button, an input switch, or the like may be used as the input unit 70.

The display unit 80 is configured with an image display panel of the smartphone. For example, the pedal rotation rate N detected by the rotation rate detecting apparatus 100 is displayed at the display unit 80. However, the image display panel is one example of the display unit 80, and, when the mobile device 50 is not a smartphone, a window dedicated for display of the rotation rate may be provided.

The rotation rate detecting apparatus 100 is configured as a processing apparatus mainly configured with a microcomputer. The rotation rate detecting apparatus 100 includes a storage unit such as a ROM in which a program to be executed by the microcomputer is stored, and a RAM in which sensor output of the acceleration sensor 60 and operation results by the microcomputer are stored. The rotation rate detecting apparatus 100 reads the sensor output of the acceleration sensor 60 and calculates the pedal rotation rate N based on the read output value by executing the program stored in the ROM in advance.

[1.2. Basic Configuration Example of Rotation Rate Detecting Apparatus]

Figure 3:
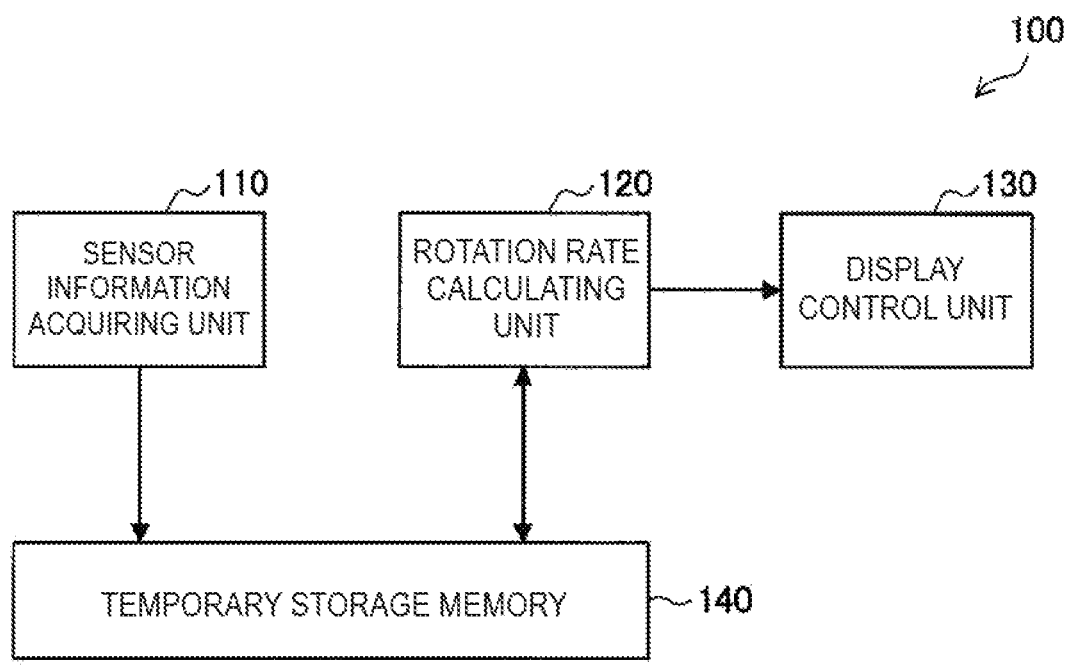
FIG. 3 is a block diagram illustrating a configuration example of a rotation rate detecting apparatus according to the first embodiment.

A configuration of the rotation rate detecting apparatus 100 according to the present embodiment will be described next with reference to FIG. 3. FIG. 3 illustrates the configuration of the rotation rate detecting apparatus 100 with functional blocks. The rotation rate detecting apparatus 100 is configured with a sensor information acquiring unit 110, a rotation rate calculating unit 120, a display control unit 130 and a temporary storage memory 140. Among these, the sensor information acquiring unit 110, the rotation rate calculating unit 120 and the display control unit 130 are specifically functions implemented by execution of the program by the microcomputer. Further, the temporary storage memory 140 is configured with a storage element such as a RAM.

The sensor information acquiring unit 110 reads the sensor output of the acceleration sensor 60 at a predetermined cycle and stores the sensor output in the temporary storage memory 140. In the present embodiment, the sensor information acquiring unit 110 reads the sensor outputs respectively corresponding to the three detection axes (u, v, w) and stores the sensor outputs in the temporary storage memory 140. Alternatively, the sensor information acquiring unit 110 may read only a sensor output corresponding to a necessary detection axis according to a specific processing aspect and store the sensor output in the temporary storage memory 140. A reading cycle of the sensor output is determined according to performance of the acceleration sensor 60 and the microcomputer, or the like. The reading cycle can be set at, for example, 20 to 30 milliseconds.

The rotation rate calculating unit 120 calculates the pedal rotation rate N based on the output value of the acceleration sensor 60 stored in the temporary storage memory 140. The detection of the pedal rotation rate N according to the present embodiment utilizes a phenomenon that the travelling direction acceleration Acc_Y changes and the bike 10 is inclined to a right side and a left side alternately as the user pedals the bike alternately with the left and right pedals 30L, 30R. The pedaling operation of the pedals 30L, 30R by the user is reflected to the travelling direction acceleration Acc_Y and the roll direction acceleration Acc_X.

Figure 4:
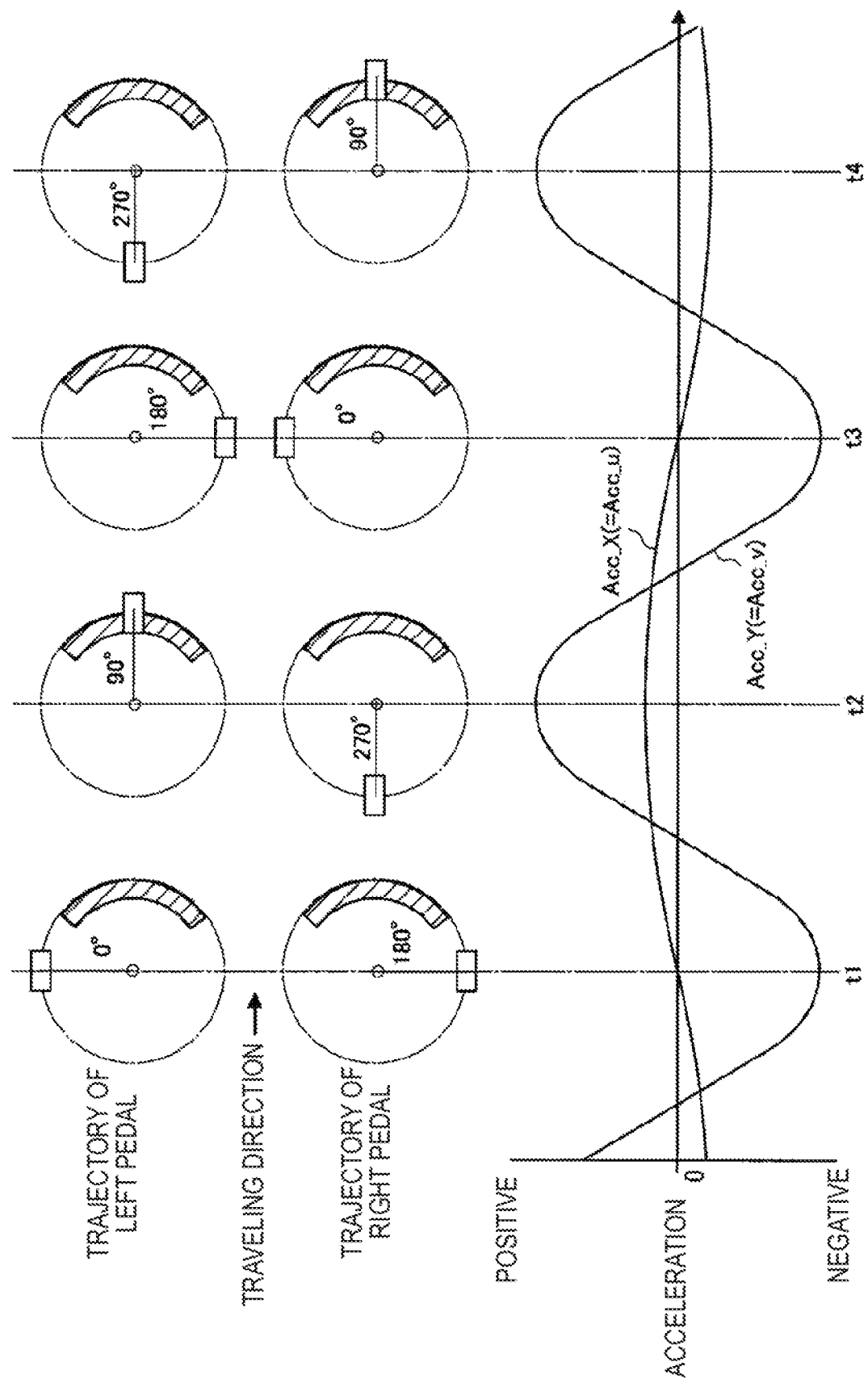
FIG. 4 is a diagram illustrating relationship between pedaling operation of a pedal, and traveling direction acceleration and roll direction acceleration according to one embodiment of the present disclosure.

FIG. 4 is a schematic diagram illustrating change of the travelling direction acceleration Acc_Y and the roll direction acceleration Acc_X in accordance with the pedaling operation of the left and right pedals 30L, 30R. FIG. 4 illustrates trajectories of the left pedal 30L and the right pedal 30R in an upper part and illustrates the respective acceleration Acc_X and Acc_Y in a lower part. The trajectories of the left and right pedals 30L, 30R are indicated such that a position of each pedal 30L, 30R is indicated with an angle while a top on an upper side is set as 0°. Further, a shaded region in the trajectories indicates a region where torque is transmitted to the bike 10 by the pedaling operation of the pedals 30L, 30R by the user. Further, in the present embodiment, the output value Acc_v corresponding to the v axis of the acceleration sensor 60 matches the travelling direction acceleration Acc_Y, and the output value Acc_u corresponding to the u axis of the acceleration sensor 60 matches the roll direction acceleration Acc_X.

Note that, in FIG. 4, the vertical direction acceleration Acc_Z is not illustrated. The vertical direction acceleration Acc_Z is less likely to largely change except that the vertical direction acceleration Acc_Z changes due to influence of irregularity, a difference in level, or the like, of the road. In the present embodiment, because the w axis of the acceleration sensor 60 is oriented to the vertical direction, the output value Acc_w corresponding to the w axis of the acceleration sensor 60 is less likely to change by the pedaling operation of the pedals 30L, 30R by the user.

In FIG. 4, when the left pedal 30L is located at a position of 0°, and the right pedal 30R is located at a position of 180° (at a time point of t1), the right pedal 30R is in a state where pedaling is finished, and the left pedal 30L is in a state before the pedaling operation is started. Therefore, at the time point of t1, the traveling direction acceleration Acc_Y is a negative value, and the roll direction acceleration Acc_X is zero.

Further, when the left pedal 30L is located at a position of 90°, and the right pedal 30R is located at a position of 270° (at a time point of t2), torque is transmitted to the bike 10 by the pedaling operation of the left pedal 30L, and the bike 10 is inclined to a left side. Therefore, at the time point of t2, both the traveling direction acceleration Acc_Y and the roll direction acceleration Acc_X are positive values.

Further, when the left pedal 30L is located at a position of 180°, and the right pedal 30R is located at a position of 0° (at a time point of t3), the left pedal 30L is in a state where pedaling is finished, and the right pedal 30R is in a state before the pedaling operation is started. Therefore, at the time point t3, the traveling direction acceleration Acc_Y is a negative value, and the roll direction acceleration Acc_X is zero.

Further, when the left pedal 30L is located at a position of 270°, and the right pedal 30R is located at a position of 90° (at a time point of t4), torque is transmitted to the bike 10 by the pedaling operation of the right pedal 30R, and the bike 10 is inclined to the right side. Therefore, at the time point of t4, the traveling direction acceleration Acc_Y is a positive value, and the roll direction acceleration Acc_X is a negative value.

In this manner, the traveling direction acceleration Acc_Y and the roll direction acceleration Acc_X regularly change by the pedaling operation of the pedals 30L, 30R. Therefore, the rotation rate calculating unit 120 can calculate the pedal rotation rate N based on at least the traveling direction acceleration Acc_Y or the roll direction acceleration Acc_X. The rotation rate calculating unit 120, for example, obtains a reference pedal rate n in a predetermined time T and calculates the pedal rotation rate N (rpm) by multiplying the reference pedal rotation rate n by 60/T. The predetermined time T can be, for example, 500 ms, but is not limited to this.

The display control unit 130 performs control to display the pedal rotation rate N calculated by the rotation rate calculating unit 120 at the display unit 80. A specific aspect of display of the pedal rotation rate N is not particularly limited, and can be set as appropriate.

[1.3. Example of Rotation Rate Detecting Processing]

The basic configuration examples of the mobile device 50 and the rotation rate detecting apparatus 100 according to the present embodiment have been described above. An example of calculation processing of the pedal rotation rate N executed by the rotation rate detecting apparatus 100 according to the present embodiment will be specifically described next.

(1.3.1. Processing Example (1) Where Traveling Direction Acceleration is Used)

Figure 5:
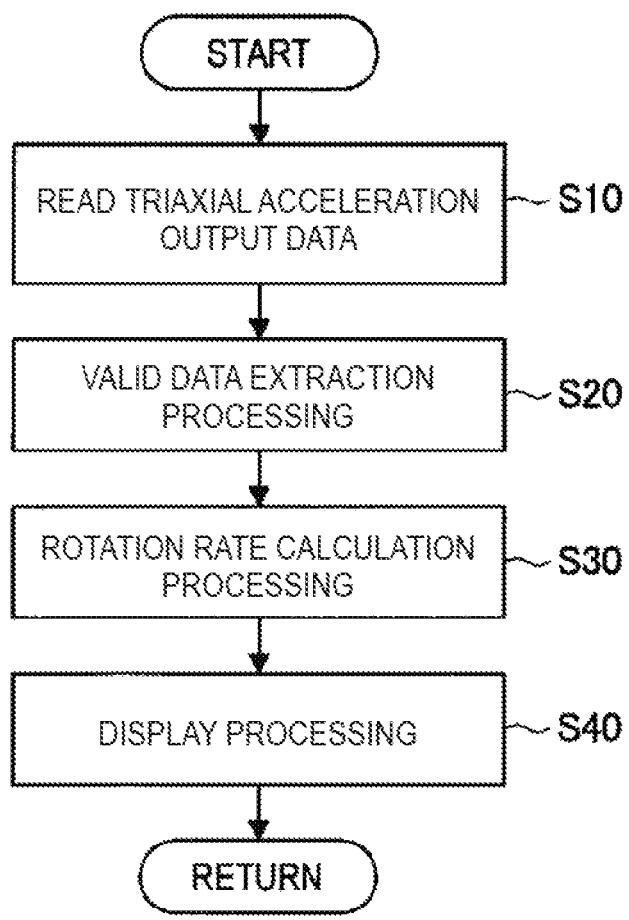
FIG. 5 is a flowchart illustrating a processing example (1) of rotation rate calculation processing according to one embodiment of the present disclosure.

FIG. 5 is a flowchart illustrating a processing example (1) of calculating the pedal rotation rate N using only the traveling direction acceleration Acc_Y. As described above, in the mobile device 50 according to the present embodiment, the v axis among the detection axes of the acceleration sensor 60 is oriented to the traveling direction (Y direction) of the bike 10. Further, as described above, the traveling direction acceleration Acc_Y regularly changes according to the pedaling operation of the left and right pedals 30L, 30R. Therefore, in the present processing example (1), the pedal rotation rate N is calculated only based on the traveling direction acceleration Acc_Y. Note that, when the present processing example (1) is executed, the acceleration sensor to be used only has to be an acceleration sensor having at least one detection axis.

First, in step S10, the sensor information acquiring unit 110 reads the output values Acc_u, Acc_v and Acc_w respectively corresponding to the three detection axes (u, v, w) of the acceleration sensor 60 and stores the output values in the temporary storage memory 140. Alternatively, the sensor acquiring unit 110 may read only the output value Acc_v corresponding to the detection axis (v) oriented to the traveling direction and store the output value in the temporary storage memory 140.

Subsequently, in step S20, the rotation rate calculating unit 120 performs processing of extracting valid data on the output value Acc_v stored in the temporary storage memory 140. In this step S20, acceleration components generated by irregularity or a difference in level of the road are removed. Further, in step S20, acceleration components which do not satisfy or which exceed the traveling direction acceleration Acc_Y and which are assumed to correspond to pedaling operation of the pedals 30L, 30R are removed.

Subsequently, in step S30, the rotation rate calculating unit 120 calculates the pedal rotation rate N based on data of the extracted traveling direction acceleration Acc_Y. For example, the rotation rate calculating unit 120 may obtain a reference pedal rotation rate n in a predetermined time T and calculate the pedal rotation rate N (rpm) by multiplying the reference pedal rotation rate n by 60/T.

Then, in step S40, the display control unit 130 displays the calculated pedal rotation rate N at the display unit 80.

Figure 6:
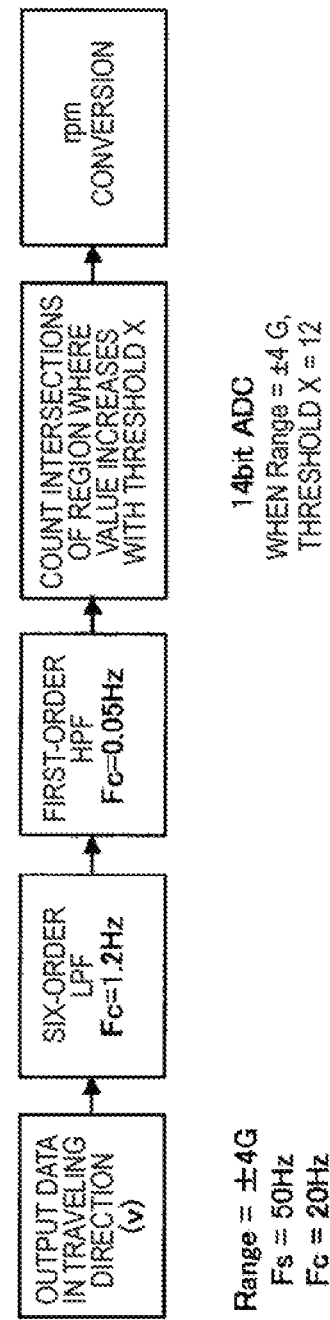
FIG. 6 is a flowchart specifically illustrating the processing example (1) of the rotation rate calculation processing according to one embodiment of the present disclosure.
Figure 7:
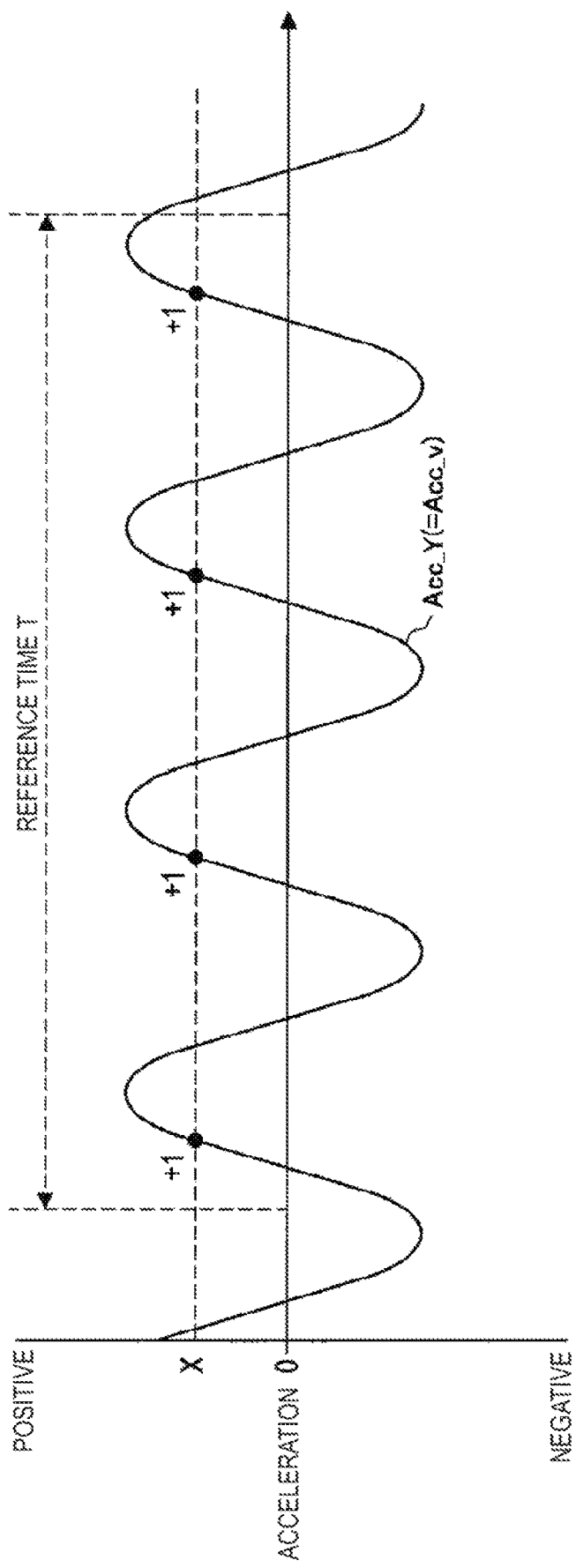
FIG. 7 is a diagram illustrating a counting method of a pedal rotation rate in the processing example (1) according to one embodiment of the present disclosure.

FIG. 6 illustrates a specific example of processing from step S10 to step S30 in the flowchart illustrated in FIG. 5. In this specific example, the sensor information acquiring unit 110 reads the output value Acc_v corresponding to the detection axis (v) oriented to the traveling direction (Y direction) assuming that the output range is ±4 G, the reading frequency Fs=50 Hz (reading cycle: 20 milliseconds), and the cutoff frequency Fc=20 Hz. The rotation rate calculating unit 120 then extracts the traveling direction acceleration Acc_Y by the pedaling operation of the pedals 30L, 30R from the read output value Acc_v using the low-pass filter. Further, the rotation rate calculating unit 120 removes direct current components from the extracted output value Acc_v using a high-pass filter. The cutoff frequency Fc upon reading of the sensor output and the cutoff frequency Fc at the low-pass filter can be set as appropriate according to a possible range of the pedal rotation rate N. As a result of only the traveling direction acceleration Acc_Y associated with the pedaling operation of the pedals 30L, 30R being extracted in this manner, fluctuation data of the traveling direction acceleration Acc_Y as illustrated in FIG. 7 can be obtained.

When the fluctuation data of the traveling direction acceleration Acc_Y can be obtained, the rotation rate calculating unit 120 counts a wavenumber of a waveform in the fluctuation data in a predetermined time T to obtain a reference pedal rotation rate n. The wavenumber can be counted by, for example, as illustrated in FIG. 7, counting the number of times a region where the traveling direction acceleration Acc_Y increases intersects with a threshold X in the fluctuation data. That is, a state where the following conditions (1) are satisfied is counted assuming that the traveling direction acceleration at time k is Acc_Y(k).

$$[Acc\_Y(k-1)<X] \wedge [Acc\_Y(k) \geq X] \quad \text{Conditions 1:}$$

While the threshold X can be, for example, 12 (m/s$^2$) when the output range is made ±4 G using an A/D converter of 14 bits, the threshold X is not limited to this. When the pedal rotation rate N is calculated using the traveling direction acceleration Acc_Y, there occurs two amplitudes corresponding to the left and right pedals 30L, 30R in the traveling direction acceleration Acc_Y every time the pedal makes one revolution. Therefore, the rotation rate calculating unit 120 sets half of the wavenumber as a reference pedal rotation rate n and calculates the pedal rotation rate N (rpm) by multiplying the reference pedal rotation rate n by 60/T.

However, how to count the wavenumber in the fluctuation data is not limited to the above-described example. For example, the number of times a region where the traveling direction acceleration Acc_Y decreases in the waveform of the fluctuation data intersects with the threshold X may be counted. In this case, a state where the following conditions (2) are satisfied may be counted assuming that the traveling direction acceleration at time k is Acc_Y(k). Alternatively, the number of upper peaks or lower peaks of the waveform in the fluctuation data may be counted. When the number of upper peaks is counted, a state where the following conditions are satisfied may be counted assuming that the traveling direction acceleration at time k is Acc_Y(k). Meanwhile, when the number of lower peaks is counted, a state where the following conditions are satisfied may be counted assuming that the traveling direction acceleration at time k is Acc_Y(k).

$$[Acc\_Y(k-1)>X] \wedge [Acc\_Y(k) \leq X] \quad \text{Conditions (2):}$$

$$[Acc\_Y(k-1)<Acc\_Y(k)] \wedge [Acc\_Y(k)>Acc\_Y(k+1)] \quad \text{Conditions (3):}$$

$$[Acc\_Y(k-1)>Acc\_Y(k)] \wedge [Acc\_Y(k)<Acc\_Y(k+1)] \quad \text{Conditions (4):}$$

As described above, according to the present processing example (1), it is possible to calculate the pedal rotation rate N based on fluctuation of the traveling direction acceleration Acc_Y occurring by the pedaling operation of the pedals 30L, 30R using the output value Acc_v corresponding to the detection axis (v) oriented to the traveling direction. Therefore, if there is at least the output value Acc_v corresponding to one axis oriented to the traveling direction of the bike 10, it is possible to detect the pedal rotation rate N. Note that the detection axis (v) of the acceleration sensor 60 and the traveling direction of the bike 10 are not required to be oriented with high accuracy, and may be oriented with such an accuracy degree that at least change of the traveling direction acceleration Acc_Y appears as a waveform.

Further, in the present processing example (1), while an example has been described where the pedal rotation rate N is calculated using only the traveling direction acceleration Acc_Y, the pedal rotation rate N may be calculated using only the roll direction acceleration Acc_X. In this case, because one amplitude occurs in the roll direction acceleration Acc_X every time the pedal makes one revolution, the pedal rotation rate N can be calculated using the waveform as the reference pedal rotation rate n without any change.

(1.3.2. Processing Example (2) Where Acceleration in Triaxial Direction is Used)

Figure 8:
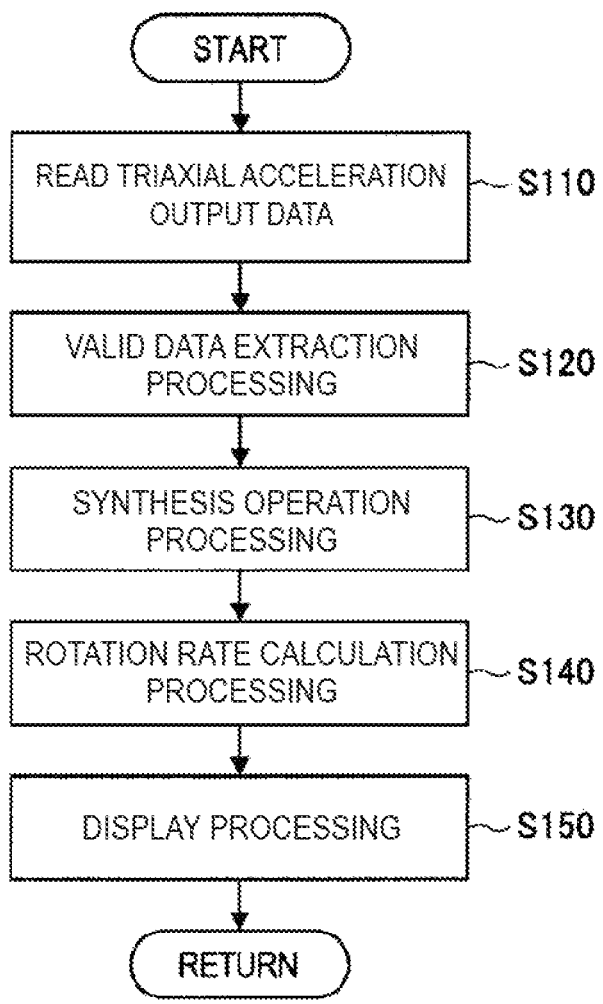
FIG. 8 is a flowchart illustrating a processing example (2) of rotation rate calculation processing according to one embodiment of the present disclosure.

FIG. 8 is a flowchart illustrating a processing example (2) where the pedal rotation rate N is calculated using the output values Acc_u, Acc_v and Acc_w corresponding to three detection axes (u, v, w). As described above, the traveling direction acceleration Acc_Y and the roll direction acceleration Acc_X regularly change according to the pedaling operation of the left and right pedals 30L, 30R. Therefore, in the present processing example (2), the pedal rotation rate N is calculated based on all the output values Acc_u, Acc_V and Acc_w including the traveling direction acceleration Acc_Y and the roll direction acceleration Acc_X.

First, in step S110, the sensor information acquiring unit 110 reads the output values Acc_u, Acc_v and Acc_w respectively corresponding to the three detection axes (u, v, w) of the acceleration sensor 60 and stores the output values in the temporary storage memory 140.

Then, in step S120, the rotation rate calculating unit 120 performs processing of extracting valid data on the output values Acc_u, Acc_v and Acc_w stored in the temporary storage memory 140. In this step S 120, acceleration components generated by irregularity or a difference in level of the road are removed. Further, acceleration components which do not reach or which exceed acceleration assumed from the pedaling operation of the pedals 30L, 30R are removed.

Then, in step S 130, the rotation rate calculating unit 120 synthesizes the extracted output values Acc_u, Acc_v and Acc_w to calculate a synthesized output value Acc_S. By calculating this synthesized output value Acc_S, it is possible to make the output values Acc_u, Acc_v and Acc_w of the acceleration sensor 60 one piece of fluctuation data.

Then, in step S 140, the rotation rate calculating unit 120 calculates the pedal rotation rate N based on fluctuation data of the obtained synthesized output value Acc_S. For example, the rotation rate calculating unit 120 obtains a reference pedal rotation rate n in a predetermined time T and calculates the pedal rotation rate N (rpm) by multiplying the reference pedal rotation rate n by 60/T.

Subsequently, in step S150, the display control unit 130 displays the calculated pedal rotation rate N at the display unit 80.

Figure 9:
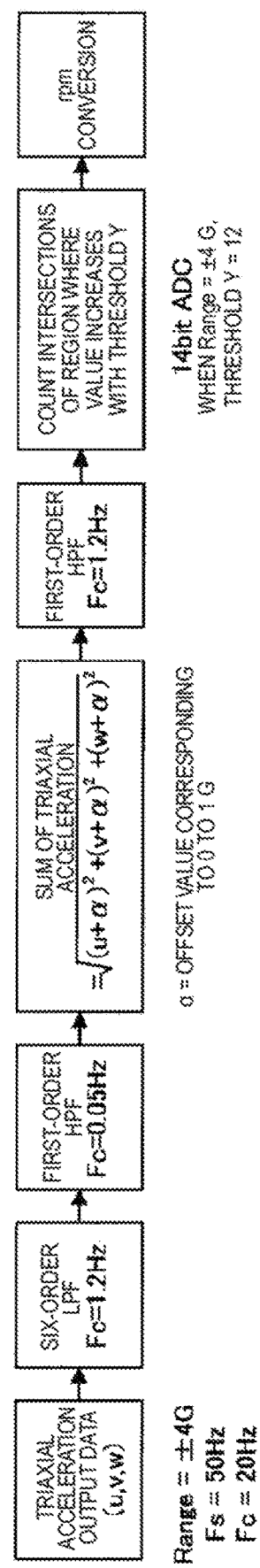
FIG. 9 is a flowchart specifically illustrating the processing example (2) of the rotation rate calculation processing according to one embodiment of the present disclosure.

FIG. 9 illustrates a specific example of processing from step S110 to step S140 in the flowchart in FIG. 8. In this specific example, the sensor information acquiring unit 110 reads the output values Acc_u, Acc_v and Acc_w corresponding to the three detection axes (u, v, w) assuming that an output range is ±4 G, a reading frequency Fs=50 Hz and a cutoff frequency Fc=20 Hz. The rotation rate calculating unit 120 then extracts the traveling direction acceleration Acc_Y and the roll direction acceleration Acc_X from the read output values Acc_u, Acc_v and Acc_w using a low-pass filter. By this means, the output values Acc_u, Acc_v and Acc_w corresponding to the traveling direction acceleration Acc_Y and the roll direction acceleration Acc_X by the pedaling operation of the pedals 30L, 30R are extracted. Further, the rotation rate calculating unit 120 removes direct current components from the extracted output values Acc_u, Acc_v and Acc_w using a high-pass filter. The cutoff frequency Fc upon reading of the sensor output and the cutoff frequency Fc at the low-pass filter can be set as appropriate according to a fluctuation cycle corresponding to a possible range of the pedal rotation rate N.

In the mobile device 50 according to the present embodiment, the three detection axes (u, v, w) are respectively oriented to a roll direction (X direction), a traveling direction (Y direction) and a vertical direction (Z direction) with respect to the traveling direction of the bike 10. Therefore, the output values Acc_u and Acc_v corresponding to the traveling direction acceleration Acc_Y and the roll direction acceleration Acc_X by the pedaling operation are basically extracted using the low-pass filter and the high-pass filter.

Further, the rotation rate calculating unit 120 calculates a synthesized output value Acc_S obtained by synthesizing the extracted output values Acc_u, Acc_v and Acc_w using the following equation (1).

[Math. 1]

$$Acc\_S = \sqrt{(Acc\_u+\alpha)^2 + (Acc\_v+\alpha)^2 + (Acc\_w+\alpha)^2} \quad \text{equation (1)}$$

Here, when waveforms of the respective output values AccVu, Acc_v and Acc_w are sinusoidal waveforms centered on zero, if the output values AccVu, Acc_v and Acc_w are simply squared, the results become folded back sinusoidal waveforms. Therefore, in the above-described equation (1), offset values α of 0 to 1 G are added to the respective output values Acc_u, Acc_v and Acc_w to obtain a square root of a sum of squares. The offset values α may be any value which can make the respective output values Acc_u, Acc_v and Acc_w positive values, and can be determined in advance through simulation, or the like.

Figure 10:
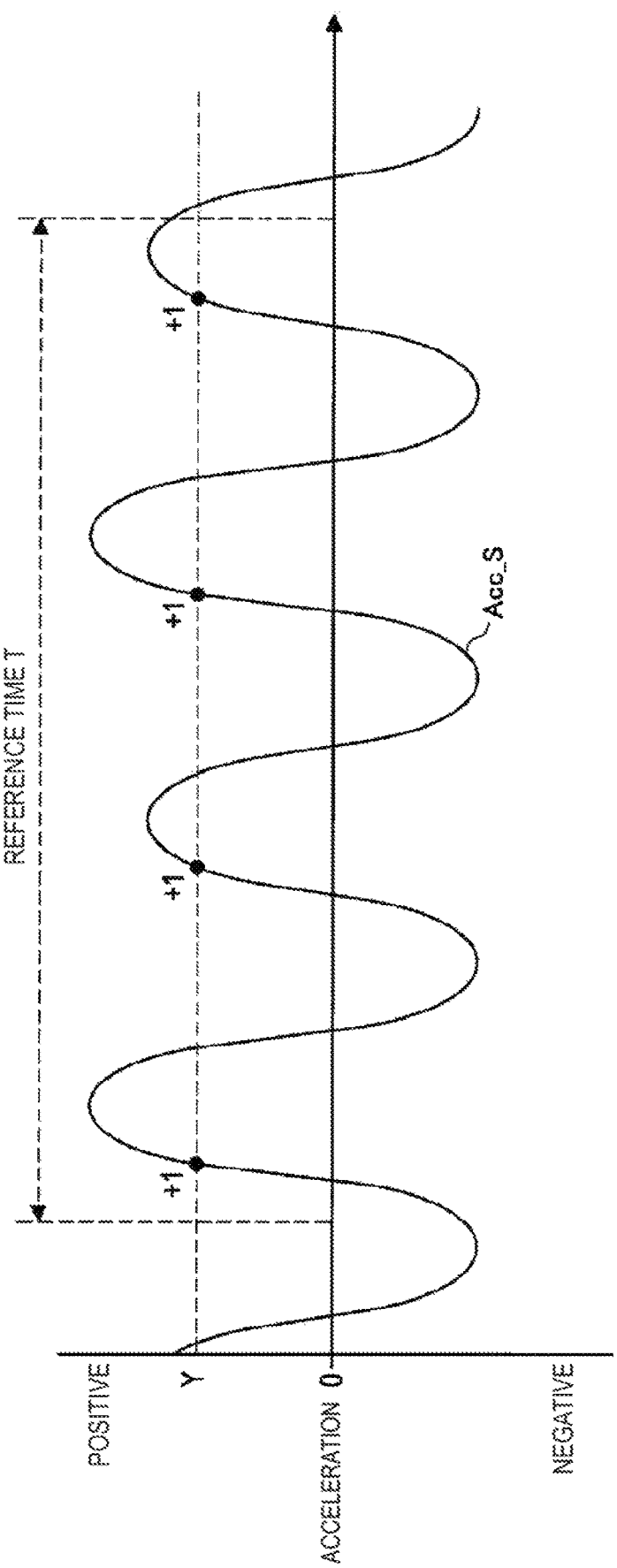
FIG. 10 is a diagram illustrating a counting method of a pedal rotation rate in the processing example (2) according to one embodiment of the present disclosure.

Subsequently, the rotation rate calculating unit 120 restores the output values by an amount corresponding to the offset values α added upon synthesis operation using the high-pass filter. In this manner, as a result of the respective output values Acc_u, Acc_v and Acc_w being synthesized, fluctuation data of the synthesized output value Acc_S as illustrated in FIG. 10 can be obtained.

When the fluctuation data of the synthesized output value Acc_S is obtained, the rotation rate calculating unit 120 counts the wavenumber of the fluctuation data in a predetermined time T to obtain the reference pedal rotation rate n. The wavenumber can be counted by, for example, counting the number of times a region where the synthesized output value Acc_S increases intersects with a threshold Y in the fluctuation data as illustrated in FIG. 10. That is, a state where conditions of [Acc_S(k−1)<Y]∧[Acc_S(k)≥Y] are satisfied is counted assuming that the output synthesized value at time k is Acc_S(k). While the threshold Y can be set at, for example, 12 (m/s$^2$) when the output range is made ±4 G using an A/D converter of 14 bits, the threshold Y is not limited to this. The rotation rate calculating unit 120 sets half of the wavenumber as a reference pedal rotation rate n and calculates the pedal rotation rate N (rpm) by multiplying the reference pedal rotation rate by 60/T.

Also in the present processing example (2), how to count the wavenumber in the fluctuation data is not limited to the above-described example. For example, the number of times a region where the traveling direction acceleration Acc_Y decreases intersects with the threshold X in the waveform of the fluctuation data may be counted. In this case, a state where conditions of [Acc_S(k−1)>Y]∧[Acc_S(k)≤Y] are satisfied may be counted assuming that the traveling direction acceleration at time k is Acc_S(k). Alternatively, the number of upper peaks or lower peaks of the waveform in the fluctuation data may be counted. When the number of upper peaks is counted, a state where conditions of [Acc_S(k−1)<Acc_S(k)]∧[Acc_S(k)>Acc_S(k+1)] are satisfied may be counted assuming that the traveling direction acceleration at time k is Acc_S(k). Further, when the number of lower peaks is counted, a state where conditions of [Acc_S(k−1)>Acc_S(k)]∧[Acc_S(k)<Acc_S(k+1)] are satisfied may be counted assuming that the traveling direction acceleration at time k is Acc_S(k).

As described above, in the present processing example (2), the output values Acc_u, Acc_v and Acc_w which become components of the traveling direction acceleration Acc_Y and the roll direction acceleration Acc_X are extracted from the three output values Acc_u, Acc_v and Acc w of the acceleration sensor 60. The traveling direction acceleration Acc_Y and the roll direction acceleration Acc_X are reflected to the extracted output values Acc_u, Acc_v and Acc_w. Further, according to the present processing example (2), the pedal rotation rate N is calculated using a synthesized output value Acc_S obtained by synthesizing the extracted output values Acc_u, Acc_v and Acc_w. Specifically, according to the present processing example (2), it is possible to calculate the pedal rotation rate N based on fluctuation data of the synthesized output value Acc_S.

Note that, in the mobile device 50 according to the present embodiment, the detection axes (u, v, w) of the acceleration sensor 60 are oriented to a roll direction (X direction), a traveling direction (Y direction) and a vertical direction (Z direction) with respect to the traveling direction of the bike 10. Further, as described above, the traveling direction acceleration Acc_Y and the roll direction acceleration Acc_X regularly changes according to the pedaling operation of the left and right pedals 30L, 30R. It is therefore also possible to calculate the pedal rotation rate N by synthesizing the two output values Acc_u and Acc_v without using the output value Acc_w corresponding to the detection axis (z) in the vertical direction.

As described above, the mobile device 50 according to the present embodiment can calculate the pedal rotation rate N using the sensor output of the acceleration sensor 60. Therefore, it is possible to calculate the pedal rotation rate N with saved power. Further, the mobile device 50 includes all components required for calculating the pedal rotation rate N, and the number of parts required for calculating the pedal rotation rate N is reduced. Particularly, with the mobile device 50 according to the present embodiment, it is possible to calculate the pedal rotation rate N using the acceleration sensor 60 without any change, which is provided at the mobile device 50 to fulfil inherent functions.

Further, the mobile device 50 according to the present embodiment is configured to be able to be attached to and detached from the bike 10. Therefore, by detaching the mobile device 50 from the bike 10 when the bike 10 is not used, it is possible to eliminate a risk of theft or prank. Further, when the user utilizes a different bike, by using the same mobile device 50 by fixing the mobile device 50 at each bike, it is possible to detect the pedal rotation rate N using one mobile device 50.

Further, in the present embodiment, while the mobile device 50 has the display unit 80, and a calculation result, or the like, of the pedal rotation rate N is displayed at the display unit 80 of the mobile device 50, the present disclosure is not limited to this example. For example, the mobile device 50 may transmit the calculation result of the pedal rotation rate N to a separate display device through wired or wireless communication means.

<2. Second Embodiment>

Figure 11:
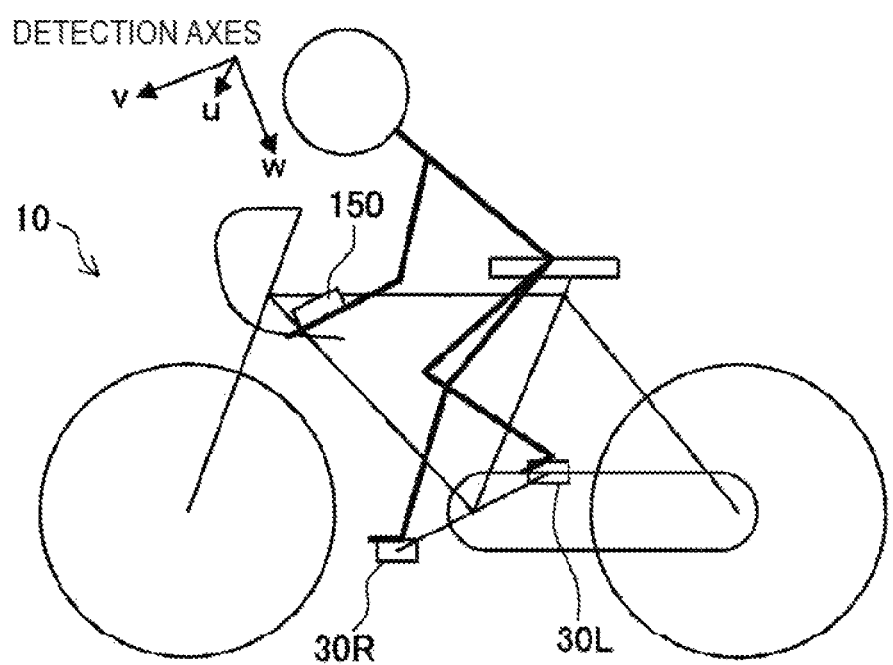
FIG. 11 is a diagram illustrating an aspect where a wearable device according to a second embodiment of the present disclosure is worn.

A wearable device including a rotation rate detecting apparatus according to the second embodiment of the present disclosure will be described next. FIG. 11 is a schematic diagram illustrating an aspect where the user wearing the wearable device 150 is riding the bike 10. The wearable device 150 according to the present embodiment is an apparatus used by being worn by the user of the bike 10, and is configured to be able to detect the pedal rotation rate N of the bike 10.

While the wearable device 150 can be, for example, a watch type wearable device, the wearable device 150 is not limited to this. Schematic configurations of the wearable device 150 and the rotation rate detecting apparatus 100 provided at the wearable device 150 can be made the same configuration as the configuration examples illustrated in FIG. 2 and FIG. 3. Also in the present embodiment, components to fulfill functions of the wearable device in related art are used as the acceleration sensor 60 to be used. That is, it is not necessary to additionally provide the acceleration sensor 60. However, the wearable device 150 according to the present embodiment is different from the mobile device 50 according to the first embodiment in that because the wearable device 150 is used by being worn by the user, detection axes of the acceleration sensor 60 cannot be oriented to particular directions.

Further, the bike 10 is an example of a riding apparatus, and the riding apparatus is not limited to the bike 10. The riding apparatus may be any apparatus if the apparatus has at least two operation pedals 30L, 30R operated by the user. However, because the wearable device 150 according to the present embodiment is used by being worn by the user, the wearable device 150 is also suitable as an apparatus for detecting the pedal rotation rate N of the riding apparatus, such as a stationary bike, which does not move by pedaling operation of the pedals.

Also in the wearable device 150 according to the present embodiment, it is possible to calculate the pedal rotation rate N using the synthesized output value Acc_S obtained by synthesizing the output values Acc u, Acc_v and Acc w of the acceleration sensor 60 according to the processing example (2) illustrated in FIG. 8 and FIG. 9. That is, in the processing example (2) illustrated in FIG. 8 and FIG. 9, the output values Acc_u, Acc_v and Acc_w which become components of the traveling direction acceleration Acc_Y and the roll direction acceleration Acc_X are extracted from the three output values Accu, _Acc_v and Acc_w of the acceleration sensor 60 and synthesized. Therefore, the synthesized output value Acc_S regularly fluctuates according to the pedaling operation of the pedals 30L, 30R regardless of orientation of the acceleration sensor 60.

Figure 12:
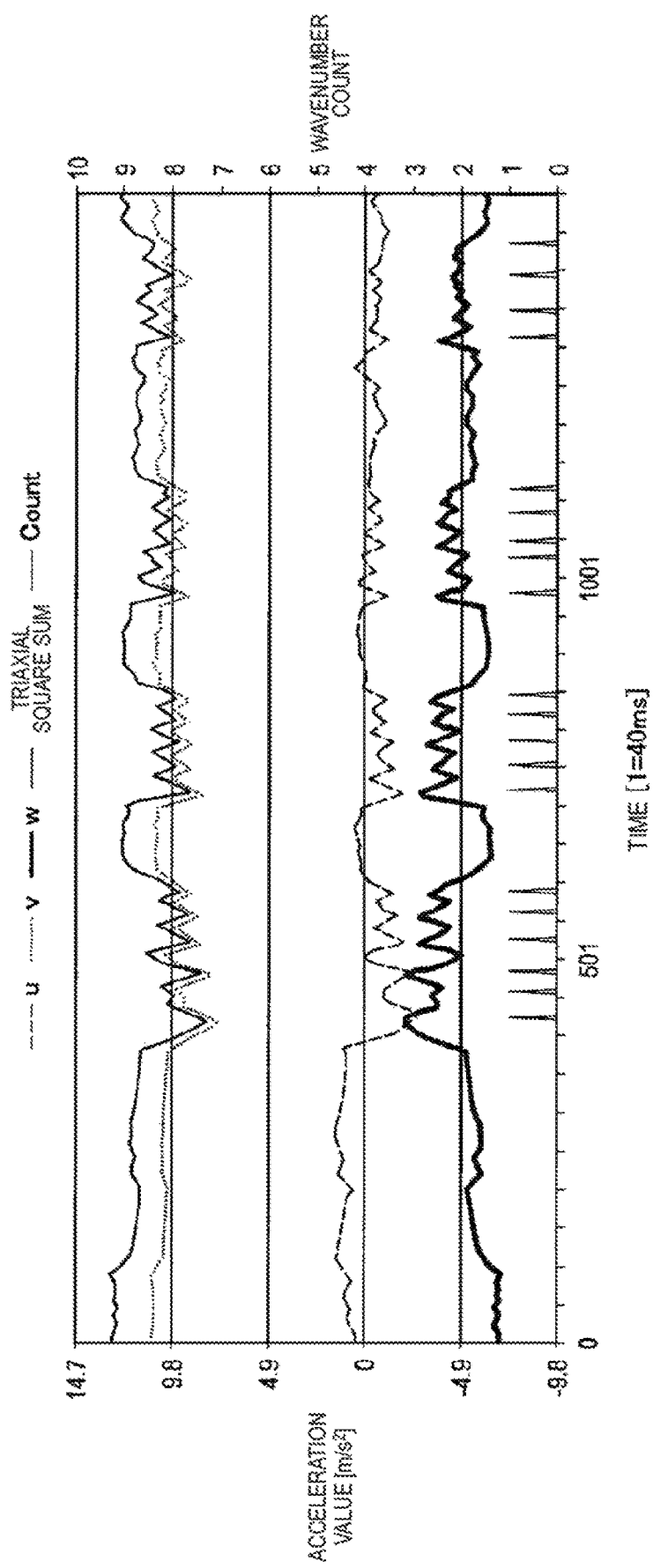
FIG. 12 is a diagram illustrating an output value of an acceleration sensor and a count of a pedal rotation rate according to the second embodiment.

FIG. 12 illustrates an aspect where the wavenumber of the waveform of the output values Acc_u, Acc_v and Acc_w of the acceleration sensor 60 and the synthesized output value Acc_S in the case where the user pedals the bike 10 while wearing the watch type wearable device 150 according to the present embodiment on the arm is counted. FIG. 12 illustrates time (1 cycle=40 milliseconds) on a horizontal axis, illustrates acceleration (m/s$^2$) on a vertical axis at the left side, and illustrates the number of counts (times) of the wavenumber on a vertical axis at the right side. The respective output values Acc_u, Acc_v and Acc_w of the acceleration sensor 60 are values from which noise is removed using the low-pass filter and the high-pass filter as illustrated in FIG. 9.

To acquire measurement data illustrated in FIG. 12, as illustrated in FIG. 11, the v axis of the acceleration sensor 60 is oriented in an arm length direction. This v axis does not exactly match the traveling direction of the bike 10. Further, the u axis of the acceleration sensor 60 is oriented in a horizontal direction with respect to the arm length direction. Still further, the w axis of the acceleration sensor 60 is oriented to a vertical direction which is orthogonal to the u axis and the v axis. Further, the output value Acc_u is output as a value in which the left side direction is positive. The output value Acc_v is output as a value in which the traveling direction of the bike 10 is positive. The output value Acc_w is output as a value in which a downward direction is positive.

As illustrated in FIG. 12, the respective output values Acc_u, Acc_v and Acc_w repeat rising and falling according to the pedaling operation of the pedals 30L, 30R. A synthesized output value Acc_S obtained by synthesizing the respective output values Acc_u, Acc_v and Acc_w using the above-described equation (1) also repeats rising and falling according to the pedaling operation of the pedals 30L, 30R. It can be seen from this measurement data that even if the three detection axes (u, v, w) of the acceleration sensor 60 are not accurately oriented to the traveling direction of the bike 10 and the roll direction with respect to the traveling direction, the synthesized output value Acc_S regularly fluctuates according to the pedaling operation of the pedals 30L, 30R. It can be said that this synthesized output value Acc_S is a synthesized value of the traveling direction acceleration Acc_Y and the roll direction acceleration Acc_X. In this measurement data, the wavenumber is counted when the synthesized output value Acc_S becomes 9.8 in a region where the waveform of the synthesized output value Acc_S increases. Time at which the wavenumber is counted matches the pedaling operation of the left and right pedals 30L, 30R.

Figure 13:
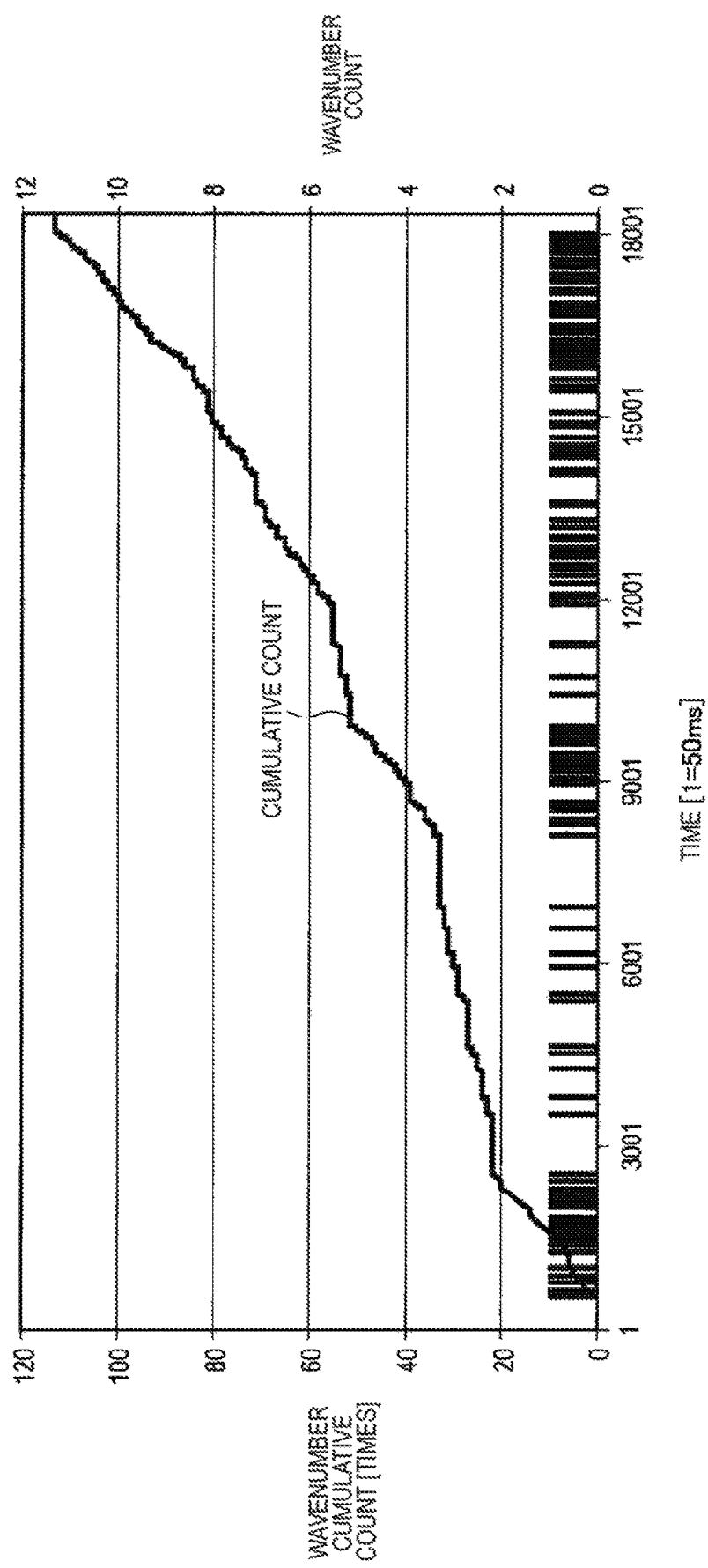
FIG. 13 is a diagram illustrating an aspect where the pedal rotation rate is counted according to the second embodiment.
Figure 14:
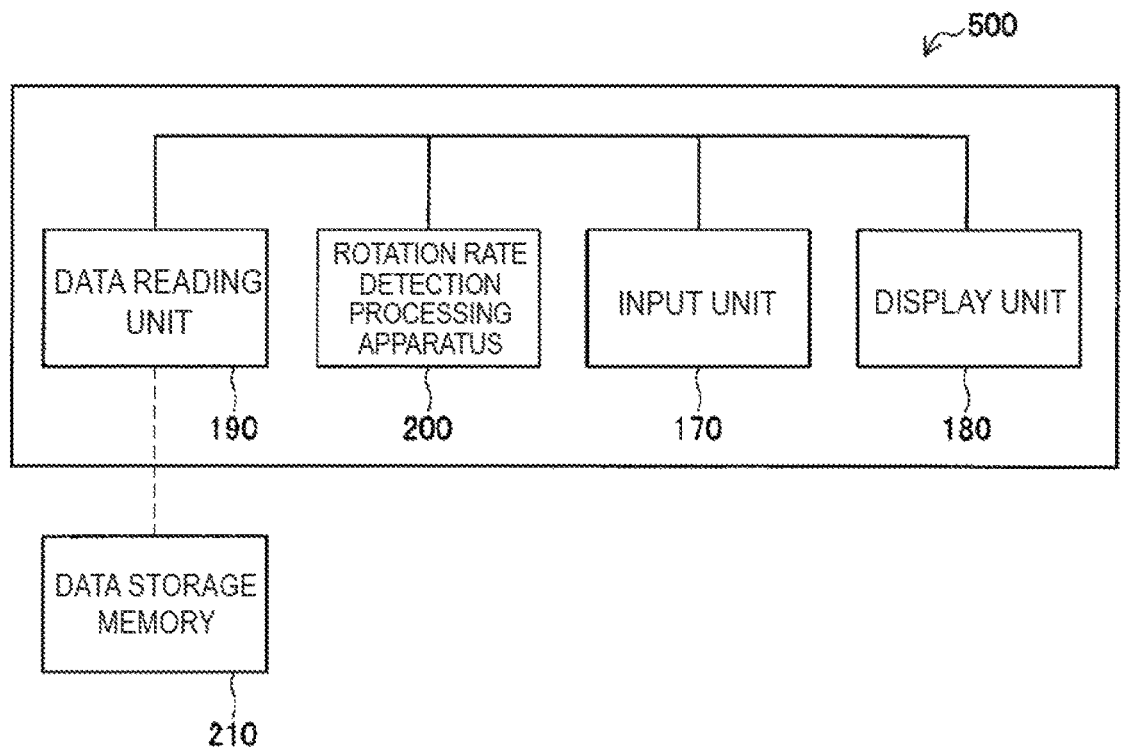
FIG. 14 is a diagram illustrating a configuration example of computer equipment according to a third embodiment of the present disclosure.

Further, FIG. 13 illustrates the cumulative counts of the wavenumber of the waveform of the synthesized output value Acc_S in the case where the user pedals the bike 10 on the same conditions as those of the measurement data illustrated in FIG. 12 and an aspect where the wavenumber is counted. FIG. 13 illustrates time (1 cycle=50 milliseconds) on a horizontal axis, illustrates the cumulative counts (times) on a vertical axis at the left side, and illustrates the number of counts (times) of the wavenumber on a vertical axis at the right side. As described above, in the present embodiment, the wavenumber is counted twice for each one revolution of the pedals 30L, 30R. Therefore, it can be seen from this measurement data that even if the three detection axes (u, v, w) of the acceleration sensor 60 are not accurately oriented to the traveling direction of the bike 10 and the roll direction with respect to the traveling direction, it is possible to calculate the pedal rotation rate N using the synthesized output value Acc_S.

As described above, the wearable device 150 according to the present embodiment can calculate the pedal rotation rate N using the output values Acc_u, Acc_v and Acc_w of the acceleration sensor 60. Therefore, it is possible to calculate the pedal rotation rate N with saved power. Further, the wearable device 150 includes all components required for calculating the pedal rotation rate N, and the number of parts required for calculating the pedal rotation rate N is reduced. Particularly, in the wearable device 150 according to the present embodiment, it is possible to calculate the pedal rotation rate N using the acceleration sensor 60 without any change, which is provided at the wearable device 150 to fulfil functions in related art.

Further, the wearable device 150 according to the present embodiment is used by being worn by the user. Therefore, because the wearable device 150 is not left at the bike 10 when the bike 10 is not used, it is possible to eliminate a risk of theft or prank. Further, when the user utilizes a different bike, it is possible to detect the pedal rotation rate N using one wearable device 150.

Further, the wearable device 150 according to the present embodiment performs processing of extracting valid data which becomes components of the traveling direction acceleration Acc_Y and the roll direction acceleration Acc_X from the output values Acc_u, Acc_v and Acc_w of the acceleration sensor 60. By this means, it is possible to make the synthesized output value Acc_S approximate a value obtained by synthesizing the traveling direction acceleration Acc_Y and the roll direction acceleration Acc_X. Therefore, even when the detection axes (u, v, w) of the acceleration sensor 60 are not oriented to the traveling direction of the bike 10 or the roll direction, it is possible to detect the pedal rotation rate N.

Note that, while the wearable device worn by the user has been described as an example in the present embodiment, the present embodiment can be applied to apparatuses other than the wearable device. For example, even when the mobile device or other apparatuses which include at least the acceleration sensor 60 and the rotation rate detecting apparatus 100 are fixed or placed on the bike without being oriented, it is possible to calculate the pedal rotation rate N as with the wearable device 150 according to the present embodiment. Further, even when the user holds such an apparatus, it is possible to calculate the pedal rotation rate N as with the wearable device 150 according to the present embodiment.

<3. Third Embodiment>

Computer equipment including the rotation rate detecting apparatus according to the third embodiment of the present disclosure will be described next. The computer equipment according to the present embodiment is configured as an apparatus which reads sensor output of the acceleration sensor 60 acquired upon cycling of the bike 10 and calculates the pedal rotation rate N. FIG. 13 is a diagram illustrating a configuration example of the computer equipment 500 according to the present embodiment. The computer equipment 500 according to the present embodiment has an input unit 170, a display unit 180, a data reading unit 190 and a rotation rate detecting apparatus 200.

The input unit 170 is configured with, for example, a keyboard, a touch panel apparatus, or the like. Further, the display unit 180 is configured with, for example, an image display monitor, or the like. The input unit 170 and the display unit 180 can be configured to have the same functions as the input unit 70 and the display unit 80 according to the first embodiment.

The data reading unit 190 reads the output values Acc_u, Acc_v and Acc_w of the acceleration sensor 60 stored in a data storage memory 210 and transmits the output values to the rotation rate detecting apparatus 200. The stored output values Acc_u, Acc_v and Acc_w of the acceleration sensor 60 are data stored upon cycling of the bike 10. The data storage memory 210 may be a storage element or a storage built into the mobile device, the wearable device, or the like, or may be a USB memory, a memory card, or the like.

The rotation rate detecting apparatus 200 can be configured to have the same configuration as the configuration of the rotation rate detecting apparatus 100 illustrated in FIG. 3. Therefore, in the rotation rate detecting apparatus 200, the data reading unit 190 acquires the output values Acc_u, Acc_v and Acc_w of the acceleration sensor 60 read by the data reading unit 190 and calculates the pedal rotation rate N using these output values Acc_u, Acc_v and Acc_w. A specific example of calculation processing can be the processing example (1) or the processing example (2) described in the first embodiment. That is, when a detection axis of the acceleration sensor 60 is oriented to the traveling direction of the bike 10, it is possible to calculate the pedal rotation rate N using only the output value corresponding to this detection axis. Alternatively, it is possible to calculate the pedal rotation rate N using a synthesized output value obtained by synthesizing output values respectively corresponding to the detection axes of the acceleration sensor 60.

According to the computer equipment 500 according to the present embodiment, even when the bike 10 or the user does not have an apparatus including a rotation rate detecting apparatus upon cycling of the bike 10, it is possible to calculate the pedal rotation rate N using the sensor output of the acceleration sensor 60. Also in the present embodiment, it is possible to reduce components used upon cycling of the bike 10 to detect the pedal rotation rate N. Further, by utilizing the mobile device or the wearable device having the acceleration sensor 60 and the data storage memory 210, it is possible to calculate the pedal rotation rate N without additionally preparing the acceleration sensor 60 and the data storage memory 210.

Note that, while in the present embodiment, the computer equipment 500 includes the display unit 180 so that the calculated pedal rotation rate N is displayed at the display unit 180, the present disclosure is not limited to this example. For example, it is also possible to employ a configuration where the computer equipment 500 transmits a calculation result of the pedal rotation rate N to separate display equipment through wired or wireless communication means.

<Fourth Embodiment>

[4.1. Configuration Example of Imaging Apparatus]

Figure 15:
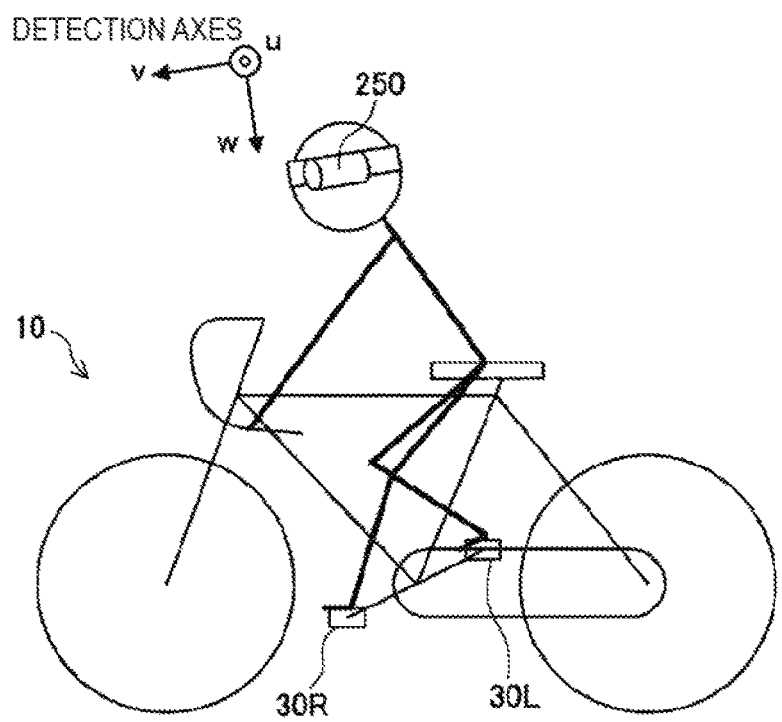
FIG. 15 is a diagram illustrating an aspect where an imaging apparatus according to a fourth embodiment of the present disclosure is worn.
Figure 16:
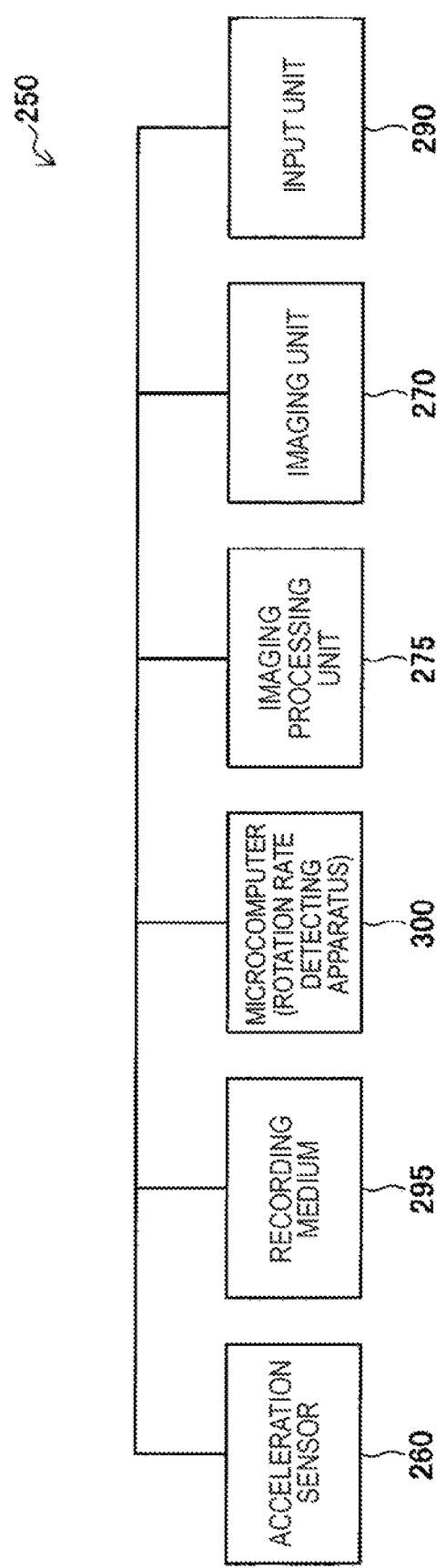
FIG. 16 is a diagram illustrating a configuration example of the imaging apparatus according to the fourth embodiment.

An imaging apparatus including the rotation rate detecting apparatus according to the fourth embodiment of the present disclosure will be described next. FIG. 15 is a schematic diagram illustrating an aspect where the user is riding the bike 10 while wearing the imaging apparatus 250, and FIG. 16 is a diagram illustrating a configuration example of the imaging apparatus 250.

In the present embodiment, the imaging apparatus 250 is used by being worn on the head of the user. The imaging apparatus 250 can be made an apparatus used for imaging and recording the surrounding scenery when the user does exercise such as, for example, cycling, skiing and jogging. However, the imaging apparatus 250 may be worn on other parts of the body of the user or fixed on the bike 10. The imaging apparatus 250 according to the present embodiment stores the sensor output of the acceleration sensor 60 in association with information of a video to be shot. The imaging apparatus 250 is configured to have an acceleration sensor 260, an imaging unit 270, an imaging processing unit 275, an input unit 290, a recording medium 295 and a rotation rate detecting apparatus 300.

The acceleration sensor 260 can be configured in a similar manner to the acceleration sensor 60 according to the first embodiment. Also in the present embodiment, if the imaging apparatus 250 includes the acceleration sensor 260 as a component for fulfilling functions in related art, it is not necessary to additionally provide the acceleration sensor 260. Further, because the imaging apparatus 250 according to the present embodiment is used by being worn on the head of the user, the imaging apparatus 250 is common with the wearable device 150 according to the second embodiment in that detection axes of the acceleration sensor 260 cannot be oriented to particular directions.

The input unit 290 is configured with, for example, a touch panel apparatus or an operation button of the imaging apparatus. By the user performing input operation on the input unit 290, the rotation rate detecting apparatus 300 can be activated or stopped. However, the touch panel apparatus or the operation button is an example of the input unit 290, and an input switch, or the like, may be used as the input unit 290.

The imaging unit 270 is configured with a lens, a solid-state imaging element such as a charge coupled device (CCD) and a complementary metal oxide semiconductor (CMOS), an interface unit which outputs an imaging signal obtained at the solid-state imaging element, or the like. The imaging signal generated at the imaging unit 270 is supplied to an imaging processing unit 275.

The imaging processing unit 275 performs signal processing on the imaging signal generated at the imaging unit 270 to generate a moving image formed with a plurality of pieces of image data. For example, the imaging processing unit 275 generates information of a video by amplifying the imaging signal generated at the imaging unit 270 at an amplifier circuit for video signals and performing predetermined signal processing, and records the information in the recording medium 295. The predetermined signal processing includes, for example, analog signal processing such as correlated double sampling (CDS) processing and gain processing using a programmable gain amplifier (PGA), and digital signal processing such as A/D conversion processing, gamma correction processing and white balance processing.

The schematic configuration of the rotation rate detecting apparatus 300 can be made the same configuration as the configuration example illustrated in FIG. 3. However, in the imaging apparatus 250 according to the present embodiment, the rotation rate detecting apparatus 300 does not include a display control unit. Further, because, in the imaging apparatus 250 according to the present embodiment, the detection axes of the acceleration sensor 260 are not oriented to the traveling direction of the bike 10 or the roll direction, processing of calculating the pedal rotation rate N is performed according to the above-described processing example (2). However, when the detection axes of the acceleration sensor 260 are oriented to the traveling direction of the bike 10 or the roll direction, processing of calculating the pedal rotation rate N may be performed according to the above-described processing example (1).

Further, the pedal rotation rate N calculated at the rotation rate calculating unit 120 is recorded in the recording medium 295 of the imaging apparatus 250. At this time, the pedal rotation rate N is recorded in association with the information of the video generated at the imaging processing unit 275. For example, the pedal rotation rate N is recorded along with time information for each piece of data of the video and the pedal rotation rate N. Alternatively, the pedal rotation rate N may be associated with the information by an identification number being assigned for each of individual successive pieces of time-series data. This association enables the pedal rotation rate N to be displayed along with the video when the video is reproduced. The recording medium 295 in which the information of the video and the pedal rotation rate N are recorded is, for example, a hard disc, or a removable medium such as a semiconductor memory such as a memory card, an optical disc and a magnetooptical disc.

Note that functions for performing control to reproduce the information of the video recorded in the recording medium 295 along with the pedal rotation rate N may be provided at the imaging apparatus 250 or may be provided at reproducing equipment to which the imaging apparatus 250 is connected. Information of the video and the pedal rotation rate N recorded in the recording medium 295 or moving image data to be reproduced is transmitted to the reproducing equipment or the image display apparatus via wired or wireless communication means which is not illustrated.

As described above, according to the imaging apparatus 250 according to the present embodiment, it is possible to display the pedal rotation rate N along with a method of the video shot during cycling of the bike 10. Further, according to the imaging apparatus 250 according to the present embodiment, even when the detection axes (u, v, w) of the acceleration sensor 60 are not oriented to the traveling direction of the bike 10 or the roll direction, it is possible to calculate the pedal rotation rate N using the output values Acc_u, Acc_v and Acc_w. Therefore, it is possible to calculate the pedal rotation rate N with saved power. Further, when the imaging apparatus 250 includes the acceleration sensor 260 to fulfil functions in related art, it is possible to calculate the pedal rotation rate N without additionally providing the acceleration sensor 260.

Further, the imaging apparatus 250 according to the present embodiment is used by being worn by the user or being attached to the bike 10. Therefore, because the imaging apparatus 250 is not left at the bike 10 when the bike 10 is not used, it is possible to eliminate a risk of theft or prank. Further, it is possible to detect the pedal rotation rate N using one imaging apparatus 250 when the user utilizes a different bike.

[4.2. Application Example of Imaging Apparatus]

The imaging apparatus 250 according to the present embodiment can be applied as described below.

(4.2.1. Application Example (1))

In the application example (1), the imaging processing unit 275 processes the imaging signal generated at the imaging unit 270, determines whether or not the bike 10 moves from, for example, change of a position of a fixed object such as a traffic signal, a tree and a building, and generates movement information of the bike 10. The generated movement information of the bike 10 is supplied to the rotation rate detecting apparatus 300.

At the rotation rate detecting apparatus 300, when valid data which becomes components of the traveling direction acceleration Acc_Y and the roll direction acceleration Acc_X is extracted from the output values Acc_u, Acc_v and Acc_w of the acceleration sensor 260 stored in the temporary storage memory 140, the movement information of the bike 10 is utilized. As a result of the imaging processing, during a time while it is determined that the bike 10 does not move, the pedals 30L, 30R should not move. Therefore, the rotation rate calculating unit 120 of the rotation rate detecting apparatus 300 processes the sensor output of the acceleration sensor 60 detected while it is not determined that the bike 10 moves or data of the pedal rotation rate N calculated based on the sensor output as noise.

According to the imaging apparatus 250 of the application example (1), it is possible to display the pedal rotation rate N more accurately assuming that the pedal rotation rate N while the bike 10 stops is zero. Note that the movement information generated at the imaging processing unit 275 may be recorded together in the recording medium 295, and upon reproduction of a video, data of the pedal rotation rate N calculated while it is not determined that the bike 10 moves may be processed as noise.

(4.2.2. Application Example (2))

In the application example (2), the imaging apparatus 250 includes a GPS sensor. A GPS signal detected at the GPS sensor includes information of a current position of the imaging apparatus 250. This GPS signal is supplied to the rotation rate detecting apparatus 300.

At the rotation rate detecting apparatus 300, when valid data which becomes components of the traveling direction acceleration Acc_Y and the roll direction acceleration Acc_X is extracted from the output values Acc_u, Acc_v and Acc_w of the acceleration sensor 260 stored in the temporary storage memory 140, the information of the current position is utilized. While the current position of the imaging apparatus 350 does not move, the bike 10 does not move, and the pedals 30L, 30R should not move. Therefore, the rotation rate calculating unit 120 of the rotation rate detecting apparatus 300 processes sensor output of the acceleration sensor 60 detected while the current position specified by the GPS signal does not change or data of the pedal rotation rate calculated based on the sensor output as noise.

According to the imaging apparatus 250 of the application example (2), it is possible to display the pedal rotation rate N more accurately assuming that the pedal rotation rate N while the bike 10 stops as zero. Note that the information of the current position specified by the GPS signal may be recorded together in the recording medium 295, and the data of the pedal rotation rate N calculated while the current position does not change may be processed as noise upon reproduction of a video.

(4.3.3. Application Example (3))

In the application example (3), the rotation rate calculating unit 120 of the rotation rate detecting apparatus 300 calculates the pedal rotation rate N and generates time-series data of the calculated pedal rotation rate N. Further, the rotation rate calculating unit 120 specifies a change point at which a change rate of the pedal rotation rate N becomes equal to or greater than a predetermined threshold in the generated time-series data. That is, this change point corresponds to a time point at which cycling of the bike 10 is started or stopped, or a time point at which the bike 10 is rapidly accelerated or rapidly decelerated. The rotation rate calculating unit 120 records this time-series data and the change point of the pedal rotation rate N together in the recording medium 295. The change point of the pedal rotation rate N is associated with the information of the video generated at the imaging processing unit 275.

According to the imaging apparatus 250 of the application example (3), it is possible to search a video using the change point of the pedal rotation rate N at which it is estimated that a movement state of the bike 10 changes as an index.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

The configuration examples described in the above-described each embodiment or application examples may be implemented in combination with each other as appropriate. For example, it is possible to apply processing of the data of the pedal rotation rate N calculated while the current position specified by the GPS signal does not change as noise described in the fourth embodiment to devices according to the first to the third embodiments.

Further, in the above-described first and second embodiments, while the rotation rate detecting apparatus 100 includes the display control unit 130, the present disclosure is not limited to this example. For example, the rotation rate detecting apparatus 100 may only accumulate the calculated pedal rotation rate N as data. In this case, it is also possible to connect the mobile device or the wearable device to equipment having a display apparatus, supply the data of the pedal rotation rate N and display the data at the display apparatus at the equipment side.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A rotation rate detecting apparatus including:

a rotation rate calculating unit configured to calculate a rotation rate of a pedal in a riding apparatus having the pedal rotating by pedaling operation of a user, based on sensor information of an acceleration sensor.

(2)

The rotation rate detecting apparatus according to (1), wherein the sensor information of the acceleration sensor is information corresponding to acceleration in a traveling direction of the riding apparatus or a roll direction with respect to the traveling direction in association with movement of the user or the riding apparatus.

(3)

The rotation rate detecting apparatus according to (1) or (2), wherein the sensor information of the acceleration sensor includes a plurality of pieces of information corresponding to a plurality of detection axes.

(4)

The rotation rate detecting apparatus according to (3), wherein the sensor information of the acceleration sensor is a value obtained by performing processing of synthesizing a plurality of output values corresponding to the plurality of detection axes.

(5)

The rotation rate detecting apparatus according to any one of (1) to (4), wherein the sensor information of the acceleration sensor is a value obtained by extracting acceleration in a traveling direction of the riding apparatus or a roll direction with respect to the traveling direction among output values of the acceleration sensor.

(6)

The rotation rate detecting apparatus according to any one of (1) to (5), wherein the sensor information of the acceleration sensor is obtained by extracting a frequency component corresponding to a possible range of the rotation rate of the pedal among output values of the acceleration sensor.

(7)

The rotation rate detecting apparatus according to any one of (1) to (6), wherein the rotation rate calculating unit is configured to obtain fluctuation of an output value of the acceleration sensor or fluctuation of a value obtained by synthesizing output values corresponding to a plurality of axes and calculate the rotation rate based on the number of amplitudes within a predetermined time.

(8)

The rotation rate detecting apparatus according to any one of (1) to (7), wherein the rotation rate calculating unit is configured to obtain fluctuation of an output value of the acceleration sensor or fluctuation of a value obtained by synthesizing output values corresponding to a plurality of detection axes and calculate the rotation rate based on the number of upper peaks or lower peaks of amplitudes within a predetermined time.

(9)

The rotation rate detecting apparatus according to any one of (1) to (7), wherein the rotation rate calculating unit is configured to obtain fluctuation of an output value of the acceleration sensor or fluctuation of a value obtained by synthesizing output values corresponding to a plurality of detection axes and calculate the rotation rate based on the number of times a region where the output value or the value increases or a region where the output value or the value decreases intersects with a predetermined threshold within a predetermined time.

(10)

The rotation rate detecting apparatus according to any one of (1) to (9), wherein the rotation rate detecting apparatus is provided at a mobile device or a wearable device including the acceleration sensor.

(11)

The rotation rate detecting apparatus according to any one of (1) to (10), wherein the rotation rate detecting apparatus is used by being fixed at the riding apparatus while being oriented in a direction defined in advance.

(12)

The rotation rate detecting apparatus according to any one of (1) to (9), wherein the rotation rate detecting apparatus is configured to be able to read the sensor information of the acceleration sensor stored in a storage medium.

(13)

The rotation rate detecting apparatus according to any one of (1) to (9)

wherein the rotation rate detecting apparatus is provided at an imaging apparatus and stores the rotation rate in association with information of a video to be imaged.

(14)

The rotation rate detecting apparatus according to (13), wherein the rotation rate calculating unit processes the sensor information of the acceleration sensor or the rotation rate detected while it is determined based on the information of the video that the riding apparatus does not move, as noise.

(15)

The rotation rate detecting apparatus according to any one of (1) to (14), wherein the rotation rate calculating unit processes the sensor information of the acceleration sensor or the rotation rate detected while it is determined from a GPS signal that the riding apparatus does not move, as noise.

(16)

The rotation rate detecting apparatus according to any one of (1) to (15), including:

a display control unit configured to display the rotation rate calculated by the rotation rate calculating unit.

(17)

The rotation rate detecting apparatus according to any one of (1) to (16), wherein the riding apparatus is a bike or a stationary bike.

(18)

A rotation rate detecting method including:

a step of detecting sensor information of an acceleration sensor in association with movement of a riding apparatus having a pedal rotating by pedaling operation of a user or the user; and a step of calculating a rotation rate of the pedal based on the detected sensor information.

(19)

A program for causing a computer to realize a function of:

calculating a rotation rate of a pedal in a riding apparatus having the pedal rotating by pedaling operation of a user based on sensor information of an acceleration sensor.

REFERENCE SIGNS LIST 10 bike
20 fixing unit
30L left pedal
30R right pedal
50 mobile device
60, 260 acceleration sensor
70, 170, 290 input unit
80, 180 display unit
100, 200, 300 rotation rate detecting apparatus
110 sensor information acquiring unit
120 rotation rate calculating unit
130 display control unit
140 temporary storage memory
150 wearable device
190 data reading unit
210 data storage memory
250 imaging apparatus
270 imaging unit
275 imaging processing unit
295 recording medium
350 imaging apparatus
500 computer equipment

The invention claimed is:

1. A rotation rate detecting apparatus, comprising:
circuitry configured to:
acquire sensor information from an acceleration sensor, wherein the sensor information corresponds to fluctuation of an output value of the acceleration sensor;
calculate, based on the sensor information, a rotation rate of a pedal in a riding apparatus, wherein the pedal is rotatable by a pedaling operation;
store the calculated rotation rate in a recording medium,
wherein the stored rotation rate is associated with information of a video generated by an imaging apparatus mounted on one of the riding apparatus or a user of the riding apparatus;
search the video based on a change point of the stored rotation rate, wherein
the change point is stored as an index for the search, and
the change point corresponds to a time of change in a movement state of the riding apparatus; and
control a display screen to concurrently display the video and the calculated rotation rate of the pedal.

2. The rotation rate detecting apparatus according to claim 1, wherein
the sensor information of the acceleration sensor further corresponds to one of an acceleration in a traveling direction of the riding apparatus or a roll direction with respect to the traveling direction, and
the roll direction is associated with at least one of a user movement or a movement of the riding apparatus.

3. The rotation rate detecting apparatus according to claim 1, wherein
the sensor information of the acceleration sensor includes a plurality of pieces of information, and
the plurality of pieces of information corresponds to a plurality of detection axes of the acceleration sensor.

4. The rotation rate detecting apparatus according to claim 3, wherein the circuitry is further configured to:
synthesize a plurality of output values, wherein the plurality of output values corresponds to the plurality of detection axes; and
obtain a value based on the synthesis of the plurality of output values, wherein the obtained value is the sensor information of the acceleration sensor.

5. The rotation rate detecting apparatus according to claim 1, wherein the circuitry is further configured to:
extract, from a plurality of output values of the acceleration sensor, an acceleration in one of a traveling direction of the riding apparatus or a roll direction with respect to the traveling direction; and
obtain a value based on the extraction, wherein the obtained value is the sensor information of the acceleration sensor.

6. The rotation rate detecting apparatus according to claim 1, wherein the circuitry is further configured to:
extract, from a plurality of output values of the acceleration sensor, a frequency component corresponding to a specific range of the rotation rate of the pedal; and
obtain the sensor information of the acceleration sensor based on the extraction.

7. The rotation rate detecting apparatus according to claim 1, wherein the circuitry is further configured to:
obtain the fluctuation of the output value of the acceleration sensor or fluctuation of a value obtained by synthesis of output values corresponding to a plurality of axes; and
calculate, within a specific time period, the rotation rate based on a number of amplitudes of the fluctuation of the output value of the acceleration sensor or the fluctuation of the value obtained by the synthesis of the output values.

8. The rotation rate detecting apparatus according to claim 1, wherein the circuitry is further configured to:
obtain the fluctuation of the output value of the acceleration sensor or fluctuation of a value obtained by synthesis of output values corresponding to a plurality of detection axes of the acceleration sensor; and
calculate, within a specific time period, the rotation rate based on at least one of:
a number of upper peaks of amplitudes of the fluctuation of the output value of the acceleration sensor or the fluctuation of the value obtained by synthesis of the output values, or
a number of lower peaks of amplitudes of the fluctuation of the output value of the acceleration sensor or the fluctuation of the value obtained by the synthesis of the output values.

9. The rotation rate detecting apparatus according to claim 1, wherein the circuitry is further configured to:

obtain the fluctuation of the output value of the acceleration sensor or fluctuation of a value obtained by synthesis of output values corresponding to a plurality of detection axes of the acceleration sensor; and calculate the rotation rate based on a number of times at least one of a region where the output value or the value increases or a region where the output value or the value decreases intersects with a specific threshold within a specific time period.

10. The rotation rate detecting apparatus according to claim 1, wherein
the rotation rate detecting apparatus is associated with at least one of a mobile device or a wearable device, and
one of the mobile device or the wearable device includes the acceleration sensor.

11. The rotation rate detecting apparatus according to claim 1, further comprising a storage medium, wherein the circuitry is further configured to read the sensor information stored in the storage medium.

12. The rotation rate detecting apparatus according to claim 1, wherein the circuitry is further configured to process one of the sensor information of the acceleration sensor or the rotation rate as noise based on a stationary state of the riding apparatus.

13. The rotation rate detecting apparatus according to claim 1, wherein the circuitry is further configured to process one of the sensor information of the acceleration sensor or the rotation rate as noise based on a GPS signal that corresponds to a stationary state of the riding apparatus.

14. The rotation rate detecting apparatus according to claim 1, wherein the riding apparatus is one of a bike or a stationary bike.

15. The rotation rate detecting apparatus according to claim 1, wherein
the rotation rate detecting apparatus is associated with a wearable device, and
the wearable device includes the acceleration sensor.

16. The rotation rate detecting apparatus according to claim 1, wherein the circuitry is further configured to:
generate time-series data of the rotation rate; and
store a change rate of the rotation rate that is equal to or greater than a determined threshold in the generated time-series data as the change point.

17. A rotation rate detecting method, comprising:
in a rotation rate detecting apparatus:
acquiring sensor information from an acceleration sensor, wherein the sensor information corresponds to fluctuation of an output value of the acceleration sensor;
calculating, based on the sensor information, a rotation rate of a pedal in a riding apparatus, wherein the pedal is rotatable by a pedaling operation;
storing the calculated rotation rate in a recording medium,
wherein the stored rotation rate is associated with information of a video generated by an imaging apparatus mounted on the riding apparatus or a user of the riding apparatus;
searching the video based on a change point of the stored rotation rate, wherein
the change point is stored as an index for the search, and
the change point corresponds to a time of change in a movement state of the riding apparatus; and
controlling a display screen to concurrently display the video and the calculated rotation rate of the pedal.

18. A non-transitory computer-readable medium having stored thereon, computer-executable instructions, which when executed by a computer, causes the computer to execute operations, the operations comprising:
acquiring sensor information from an acceleration sensor, wherein the sensor information corresponds to fluctuation of an output value of the acceleration sensor;
calculating, based on the sensor information, a rotation rate of a pedal in a riding apparatus, wherein the pedal is rotatable by a pedaling operation;
storing the calculated rotation rate in a recording medium,
wherein the stored rotation rate is associated with information of a video generated by an imaging apparatus mounted on the riding apparatus or a user of the riding apparatus;
searching the video based on a change point of the stored rotation rate, wherein
the change point is stored as an index for the search, and
the change point corresponds to a time of change in a movement state of the riding apparatus; and
controlling a display screen to concurrently display the video and the calculated rotation rate of the pedal.

* * * * *